June 10, 1958     H. J. HELD ET AL     2,838,062
TRICKLE VALVE

Filed Sept. 12, 1955     2 Sheets-Sheet 1

INVENTOR.
HANS J. HELD
JOHN WEITS
BY Arthur H. Seidel
ATTORNEY

June 10, 1958 H. J. HELD ET AL 2,838,062
TRICKLE VALVE
Filed Sept. 12, 1955 2 Sheets-Sheet 2
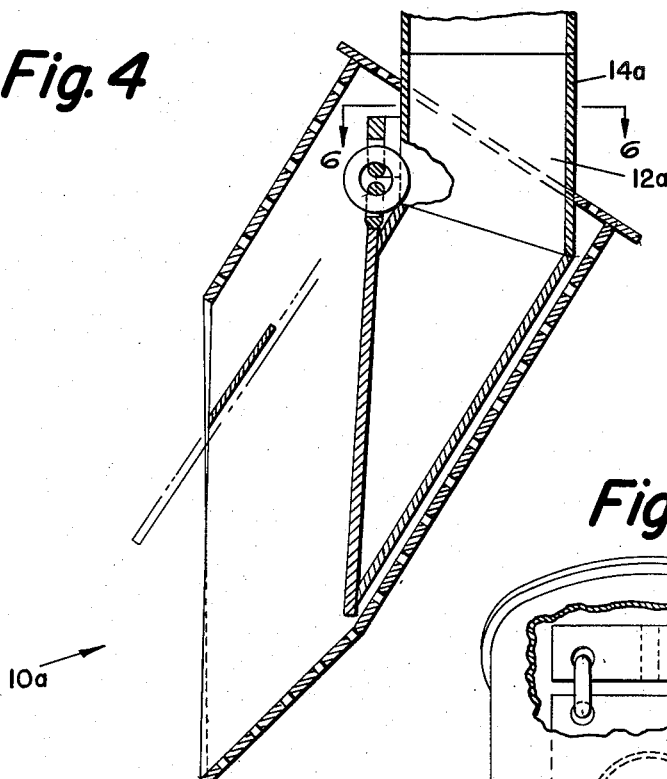
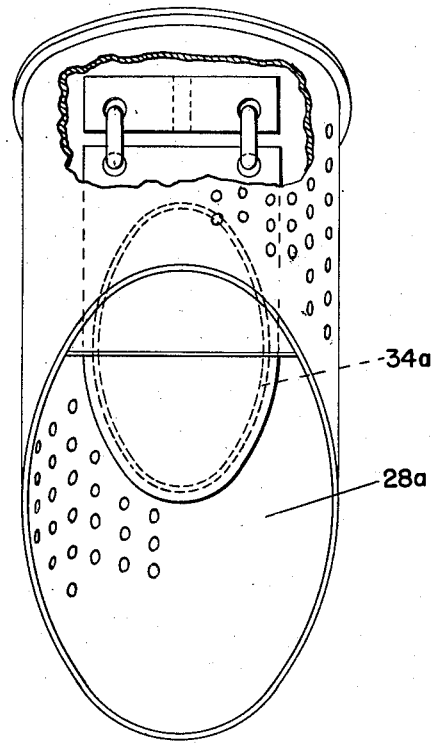
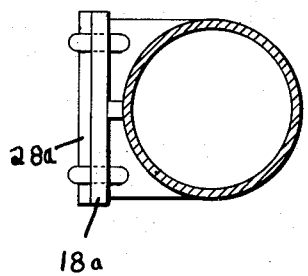
INVENTOR.
HANS J. HELD
JOHN WEITS
BY Arthur H. Seidel
ATTORNEY

United States Patent Office 2,838,062
Patented June 10, 1958

2,838,062

TRICKLE VALVE

Hans J. Held, Lake Success, and John Weits, Westbury, N. Y., assignors to Ducon Company, Inc., Mineola, N. Y., a corporation of New York Application September 12, 1955, Serial No. 533,854

7 Claims. (Cl. 137—382)

This invention relates to a trickle valve, and more particularly to a trickle valve which may be suspended within a dense phase fluidized bed, and which may be used to control the flow of gases up through a conduit having suspended solid particles therein, while permitting the discharge of solid particles therefrom.

The so-called "fluid process" has gained widespread adoption in the petroleum and chemical industries. In this process, finely divided catalyst particles, such as catalyst particles having a mesh size of 80 mesh or smaller, are maintained suspended in a gas in the so-called "fluidized state" or "fluid state" during reaction conditions. While in this fluid state, these particles undergo the phenomenon known as hindered settling, namely they possess many of the properties of a liquid. Thus, they may be conveyed from one vessel to another through a conduit, they develop a pressure head, etc.

In petroleum technology, in particular, it is the custom to contact the reactants to be treated with particles of such catalysts under greatly elevated temperatures. For example, in petroleum cracking processes the cracking reaction is effected at a temperature in the range of 750 to 975° F. Under these high temperature conditions, contact between the crude hydrocarbon oil, normally a gas oil fraction, and the solid catalyst particles results in cracking of the crude oil fraction to desirable lower boiling products, such as gasoline and the like.

Fluid reactors, regenerators, and similar vessels must be provided with means for separating solids from gases. Such means must be positioned either in the upper portion of the reactor, or above the reactor in order to permit removal of entrained fluid catalysts from the gases, and to permit the retention of such entrained catalyst particles in the fluid vessel. Such separation means normally comprises a cyclone separator in which separation of the solid particles from the gas is effected by centrifugal motion, after which the solid particles are returned to the fluidized mass of particles within the fluid vessel, by a dip leg which descends into the fluid bed, either into the dilute phase of the fluid bed or the dense phase thereof.

Due to the flow of gas and solid particles through the cyclone separator, a pressure differential exists between the fluid vessel and the return dip leg of the cyclone separator. This pressure differential induces gaseous reactants being treated within the fluid vessel to flow upwardly through the dip leg and into the cyclone separator, instead of through the intended path; namely, through the fluid and solid inlet in the hopper of the cyclone separator. Such upward flow through the dip leg and the cyclone separator seriously interferes with the operational efficiency of the cyclone separator and may even prevent its satisfactory operation.

Furthermore, the placing of fluid vessels in operation has required an extended starting-up period in order to establish a barometric seal between the lower portion of the cyclone separator's dip leg and the surrounding vessel. Similarly, extended starting-up periods are required when upset conditions are encountered. Inasmuch as each day off-stream may cost many thousands of dollars in the case of large fluid vessels, the elimination of extended start-up periods, and the avoidance of difficulties in effecting a barometric seal between the cyclone separator dip leg and the surrounding vessel is most desirable.

Extensive efforts have been made to develop a trickle valve which would effect a satisfactory seal between the cycline separator dip leg and the surrounding fluid vessel. However, such prior efforts have not proved fruitful, due to the many difficulties concomitant with achieving reliable valve operation at elevated temperatures, and in environments where rust and coke build-up are encountered, and with the valve members being exposed to mixtures containing a gas and solid.

The problems concomitant with valve operation within a fluid vessel are greatly increased when it is necessary or desirable to have the valve positioned within the dense phase of the fluid bed, rather than in the bed's dilute phase. Thus, the impingement of the turbulent dense phase fluidized particles upon the valve interferes with its satisfactory operation and may effect jamming or malfunctioning thereof. Furthermore, protection of the valve from its environment cannot be feasibly accomplished by means of large size housings and the like, as such housings interfere with the satisfactory and facile flow of fluidizing gas through the dense phase fluidized bed, and may lead to loss of fluidization in the region of the valve, which in turn may lead to excessive coking and related problems.

It is an object of the present invention to provide an improved trickle valve.

It is an additional object of the present invention to provide a trickle valve which will perform satisfactorily within a dense phase fluidized bed.

It is a further object of the present invention to provide a trickle valve which will perform without malfunction under greatly elevated temperatures, and in environments where rust and coke build-up are encountered.

It is another object of the present invention to provide a trickle valve useful in conjunction with the dip leg of cyclone separators or the like.

For the purpose of illustrating the invention there is shown in the drawings forms which are presently preferred; it being understood, however, that this invention is not limited to the precise arrangements and instrumentalities shown.

Reference should be had to the following drawings, in which like reference characters refer to like parts:

Figure 4 is a vertical sectional view of another embodiment of the trickle valve of the present invention.

Figure 5 is a front elevational view of the valve embodiment shown in Figure 4 with parts being cut away for greater clarity of presentation.

Figure 6 is a section on line 6—6 of Figure 4.

Figure 1:
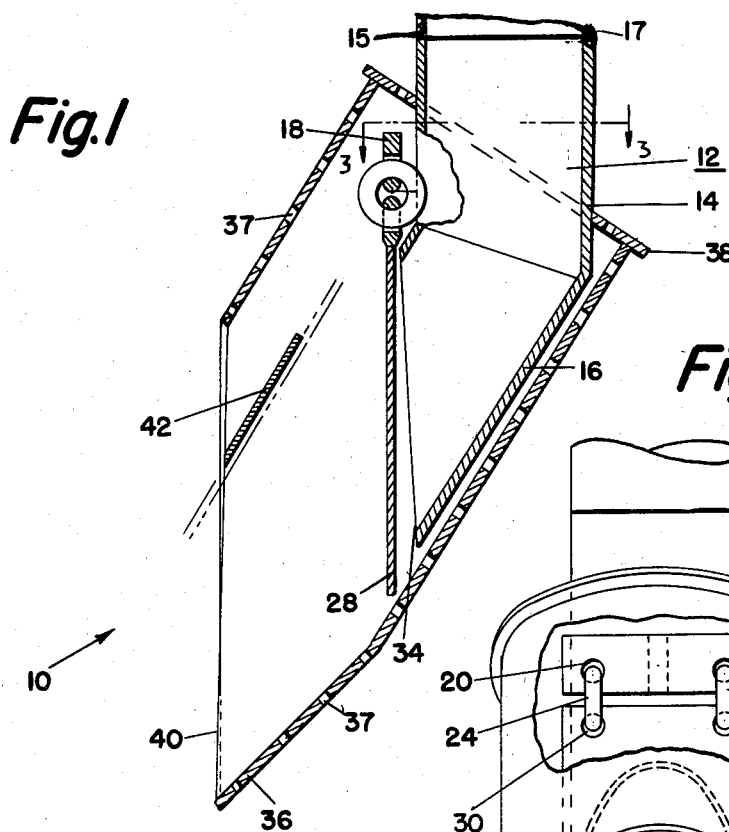
Figure 1 is a vertical sectional view of one embodiment of the trickle valve of the present invention.
Figure 2:
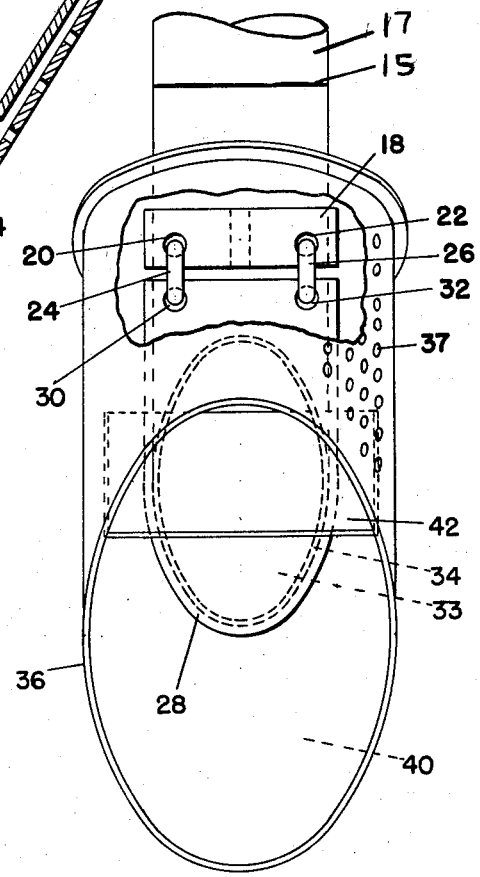
Figure 2 is a front elevational view of the valve embodiment shown in Figure 1, with parts being cut away for greater clarity of presentation.
Figure 3:
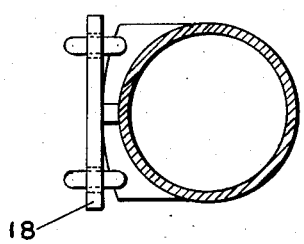
Figure 3 is a sectional view on line 3—3 of Figure 1.

Referring to the drawings, and initially to Figures 1, 2, and 3, the trickle valve shown in these figures is designated generally by the numeral 10. Valve 10 comprises a body number designated generally by the numeral 12, which body member consists of an angularly bent conduit made up of portions 14 and 16; the upper portion 14 of which is lineal, and the under portion 16 of which is angularly disposed thereto at an angle to the vertical, the portions 14 and 16 forming the continuous conduit making up body member 12.

The upper end of portion 12 is secured as by welded joint 15 to the bottom end 17 of the dip leg of a cyclone separator.

T-shaped support bracket 18 is welded, or otherwise fixedly secured, to the outer surface of upper portion 14 of body member 12 proximate the junction with lower portion 16. The head of the T bracket 18 is a flat bar generally parallel to the axis of upper portion 14 and spaced somewhat therefrom. The T head of bracket 18 is provided with a pair of openings 20 and 22 through which respective annular or O-shaped hinges 24 and 26 are inserted. For the purposes of the present invention the diameter of the openings 20 and 22 must be appreciably greater than the diameter of the rod used for making O-shaped hinges 24 and 26, in order that O-shaped hinges 24 and 26 may move freely through openings 20 and 22 both vertically and laterally, notwithstanding the thermal expansion of the hinge metal at the valve operating temperature, which may be close to 1000° F. A flat rectangular valve plate 28 is carried on O-shaped hinges 24 and 26, with the O-shaped hinges 24 and 26 passing through respective openings 30 and 32 in the upper portion of valve plate 28. As with openings 20 and 22, it is essential that the diameter of openings 30 and 32 be appreciably greater than the diameter of the rod used for making O-shaped hinges 24 and 26 in order to permit facile rotational movement of hinges 24 and 26 through openings 30 and 32, and also to permit lateral movement of hinges 24 and 26 in openings 30 and 32.

Valve plate 28 seats against the discharge opening 33 of lower portion 16 which is encompassed by valve seat 34. Valve plate 28 has an appreciably greater area, and greater maximum horizontal and vertical dimensions than valve seat 34, so that valve plate 28 may be seated against valve seat 34 in a plurality of laterally disposed positions, and may move in a plane parallel to that of valve seat 34 or in an angle to such plane. Accordingly, the disposition of O-shaped hinges 24 and 26 within openings 20 and 22, or openings 30 and 32, to the right or left of center or above or below center in respect to the centers of such openings will not adversely affect the seating of valve plate 28.

In the embodiments shown in Figures 1, 2, and 3, the plane of the outer surface of valve seat 34 is spaced from the vertical so that there is no contact between valve plate 28 and valve seat 34 when the former is in its neutral position induced by the force of gravity. Thus, valve 10 is normally biased by gravity to an open position, and is closed by the pressure drop in body member 12, such pressure drop urging valve plate 28 against valve seat 34. When closed by such pressure drop, valve plate 28 will remain closed until there is a sufficient head of material within body member 12 to urge valve plate 28 away from valve seat 34, thereby permitting the material to be discharged from the discharge opening 33.

Inasmuch as valve plate 28 will remain closed when the pressure within the body member 12 is less than that of the surrounding environment, build-up of a pressure head equalling that of the environment surrounding body member 12 by material within body member 12 and the dip leg 17 secured thereabove will be facilitated.

Upper portion 14 and lower portion 16 of trickle valve 10 are confined within perforated generally tubular housing designated generally by the numeral 36 having a sealing plate 38, which is affixedly and embracedly secured to the upper portion 12. Perforated tubular housing 36 is provided with a discharge opening 40 through which particles released from discharge opening 33 may be discharged from trickle valve 10.

A stop plate 42 is fixedly secured within perforated tubular housing 36 and limits the backward movement of valve plate 28. The perforated tubular housing 36 protects the remainder of trickle valve 10 from its environment. Thus, trickle valve 10 may be immersed within the dense phase fluidized bed of a fluid vessel, such as a conventional fluid catalytic cracking reactor, or generator, or like apparatus for effecting fluid catalytic operations, without the particles of such dense phase fluidized catalyst bed adversely interfering with the operation of trickle valve 10, or the seating of valve plate 28 against its seat 34.

The perforated tubular housing 36 therefore protects the inner portion of trickle valve 10 from erosion, and the like, and yet does not divert or obstruct the passage of fluidizing gas through the dense phase fluidized bed within which trickle valve 10 is immersed. The perforations 37 in tubular housing 36 permit the facile flow of fluidizing gas therethrough.

In the embodiment of the present invention shown in Figures 4, 5, and 6, the trickle valve shown therein and designated 10a, is identical to valve embodiment 10, save that the plane formed by the outer surface of the valve seat 34a is angularly disposed in respect to the vertical, so that the valve plate 28a is always biased to a closed position. This embodiment has the advantage in that a shorter conduit above the upper portion 14a of body member 12a, e. g. a shorter cyclone dip leg, need be provided to insure a given head and the requisite height of fluidized solids above the discharge opening of body member 12a needed to equal a predetermined head level may be reduced, since the gravity bias of valve plate 28a effects a tighter seal against valve seat 34a. The increase in density of the solids in the cyclone dip leg produces a better seal and more efficient operation of the cyclone separator.

This application is a continuation in part of our application Serial No. 357,874, filed May 27, 1953 for "Trickle Valve for Dust Collectors," now abandoned.

The present invention may be embodied in other specific forms without departing from the spirit or essential attributes thereof and, accordingly, reference should be made to the appended claims, rather than to the foregoing specification as indicating the scope of the invention.

We claim:

1. A trickle valve for use in high temperature fluid catalytic operations including a conduit, a bracket fixedly secured to the outer surface of said conduit, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, said valve plate being juxtaposed suspended in respect to the discharge opening of the conduit, the width and length of said valve plate being appreciably greater than the maximum width and length dimensions of the discharge opening of the conduit, the face of the valve plate juxtaposed to the discharge opening of the conduit seating against the edge of the discharge opening of the conduit when said valve plate is disposed in its closed position, and said juxtaposed face of the valve plate being disposed away from the edge of the discharge opening of the conduit when the valve plate is disposed in its open position, and an open-ended perforated housing surrounding said valve plate and the portion of said conduit adjacent and including the discharge opening, the open-end of said perforated housing being in communication with and spaced from and at least partially below the discharge opening, the lowermost portion of said housing projecting beyond the valve plate a sufficient distance so that it extends beyond the valve plate when the valve plate is disposed in its open position, said lowermost portion also projecting beyond the hinge for an appreciable distance.

2. A trickle valve for use in high temperature fluid catalytic operations including a conduit, a bracket fixedly secured to the outer surface of said conduit, said bracket having an opening therein, a closed loop hinge formed from a rod having a core thickness appreciably less than the inner diameter of said opening, said hinge being mounted through the opening in said bracket, a valve plate, said hinge passing through an opening in the oupper portion of said valve plate whereby said valve plate is suspended from said hinge, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, said valve plate being juxtaposedly suspended in respect to the discharge opening of the conduit, the width and length of said valve plate being appreciably greater than the maximum width and length dimensions of the discharge opening of the conduit, the face of the valve plate juxtaposed to the discharge opening of the conduit seating against the edge of the discharge opening of the conduit when said valve plate is disposed in its closed position, and said juxtaposed face of the valve plate being disposed away from the edge of the discharge opening of the conduit when the valve plate is disposed in its open position, said valve plate being biased by gravity to its closed position, and an open-ended perforated housing surrounding said valve plate and the portion of said conduit adjacent and including the discharge opening, the open-end of said perforated housing being in communication with and spaced from and at least partially below the discharge opening, the lowermost portion of said housing projecting beyond the valve plate a sufficient distance so that it extends beyond the valve plate when the valve plate is disposed in its open position, said lowermost portion also projecting beyond the hinge for an appreciable distance.

3. A trickle valve for use in high temperature fluid catalytic operations including a conduit, a bracket fixedly secured to the outer surface of said conduit, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, said valve plate being juxtaposedly suspended in respect to the discharge opening of the conduit, the width and length of said valve plate being appreciably greater than the maximum width and length dimensions of the discharge opening of the conduit, the face of the valve plate juxtaposed to the discharge opening of the conduit seating against the edge of the discharge opening of the conduit when said valve plate is disposed in its closed position, and said juxtaposed face of the valve plate being disposed away from the edge of the discharge opening of the conduit when the valve plate is disposed in its open position, said valve plate being biased by gravity to its open position, and an open-ended perforated housing surrounding said valve plate and the portion of said conduit adjacent and including the discharge opening, the open-end of said perforated housing being in communication with and spaced from and at least partially below the discharge opening, the lowermost portion of said housing projecting beyond the valve plate a sufficient distance so that it extends beyond the valve plate when the valve plate is disposed in its open position, said lowermost portion also projecting beyond the hinge for an appreciable distance.

4. A trickle valve for use in high temperature fluid catalytic operations including a conduit, a bracket fixedly secured to the outer surface of said conduit, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, said valve plate being juxtaposedly suspended in respect to the discharge opening of the conduit, the width and length of said valve plate being appreciably greater than the maximum width and length dimensions of the discharge opening of the conduit, the face of the valve plate juxtaposed to the discharge opening of the conduit seating against the edge of the discharge opening of the conduit when said valve plate is disposed in its closed position, and said juxtaposed face of the valve plate being disposed away from the edge of the discharge opening of the conduit when the valve plate is disposed in its open position, and an open-ended perforated housing surrounding said valve plate and the portion of said conduit adjacent and including the discharge opening, the open-end of said perforated housing being in communication with and spaced from and at least partially below the discharge opening, and a stop member in said perforated housing juxtaposed to the face of the valve plate opposite the valve plate face that is juxtaposed to the discharge opening for limiting the movement of the valve plate away from the discharge opening, the lowermost portion of said housing projecting beyond the valve plate a sufficient distance so that it extends beyond the valve plate when the valve plate is disposed in its open position, said lowermost portion also projecting beyond the hinge for an appreciable distance.

5. A trickle valve for use in high temperature fluid catalytic operations including a conduit, a bracket fixedly secured to the outer surface of said conduit, said bracket having a plurality of openings therein, a closed loop hinge carried in each said opening, each hinge formed from a rod having a core thickness appreciably less than the inner diameter of its opening, a valve plate, each of said hinges passing through an opening in the upper portion of said valve plate whereby said valve plate is suspended from said hinges, each of the openings in said valve plate extending between the face of said valve plate that is juxtaposed to the discharge opening of said conduit and the face opposite thereto whereby a portion of each of said hinges projects beyond said juxtaposed face and overlaps the portion of said conduit adjacent the discharge opening, and a portion of each of said hinges projects beyond the face opposite to the face juxtaposed to the discharge opening, each of the openings in said valve plate having an inside diameter appreciably larger than the core thickness of the rod forming the hinge disposed therewithin, the diameter of the openings in said bracket and valve plate being so much larger than the core thickness of the rod forming the hinges as to permit both lateral and rotational movement of said hinges through said openings, said valve plate being juxtaposedly suspended in respect to the discharge opening of the conduit, the width and length of said valve plate being appreciably greater than the maximum width and length dimensions of the discharge opening of the conduit, the face of the valve plate juxtaposed to the discharge opening of the conduit seating against the edge of the discharge of the conduit when said valve plate is disposed in its closed position, and said juxtaposed face of the valve plate being disposed away from the edge of the discharge opening of the conduit when the valve plate is disposed in its open position, and an open-ended perforated housing surrounding said valve plate and the portion of said conduit adjacent and including the discharge opening, the open-end of said perforated housing being in communication with and spaced from and at least partially below the discharge opening, and a stop member in said perforated housing juxtaposed to the face of the valve plate opposite the valve plate face that is juxtaposed to the discharge opening for limiting the movement of the valve plate away from the discharge opening, the lowermost portion of said housing projecting beyond the valve plate a sufficient distance so that it extends beyond the valve plate when the valve plate is disposed in its open position, said lowermost portion projecting beyond each of the hinges for an appreciable distance.

6. A trickle valve for use in high temperature fluid catalytic operations including a conduit, a bracket fixedly secured to the outer surface of said conduit, said bracket having an opening therein, an O-shaped hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, said valve plate being juxtaposedly suspended in respect to the discharge opening of the conduit, the width and length of said valve plate being appreciably greater than the maximum width and length dimensions of the discharge opening of the conduit, the face of the valve plate juxtaposed to the discharge opening of the conduit seating against the edge of the discharge opening of the conduit when said valve plate is disposed in its closed position, and said juxtaposed face of the valve plate being disposed away from the edge of the discharge opening of the conduit when the valve plate is disposed in its open position, and an open-ended perforated housing surrounding said valve plate and the portion of said conduit adjacent and including the discharge opening, the open-end of said perforated housing being in communication with and spaced from and at least partially below the discharge opening, the lowermost portion of said housing projecting beyond the valve plate a sufficient distance so that it extends beyond the valve plate when the valve plate is disposed in its open position, said lowermost portion also projecting beyond the hinge for an appreciable distance.

7. A trickle valve for use in high temperature fluid catalytic operations including a conduit, a bracket fixedly secured to the outer surface of said conduit, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, said valve plate being juxtaposedly suspended in respect to the discharge opening of the conduit, the width and length of said valve plate being appreciably greater than the maximum width and length dimensions of the discharge opening of the conduit, the face of the valve plate juxtaposed to the discharge opening of the conduit seating against the edge of the discharge opening of the conduit when said valve plate is disposed in its closed position, and said juxtaposed face of the valve plate being disposed away from the edge of the discharge opening of the conduit when the valve plate is disposed in its open position, and an open-ended perforated housing encompassing said valve plate, said hinge, said bracket, and the portion of said conduit adjacent and including the discharge opening, said housing being fixedly secured to said conduit at a point above its discharge opening, the open-end of said perforated housing being in communication with and spaced from and at least partially below the discharge opening, the lowermost portion of said housing projecting beyond the valve plate a sufficient distance so that it extends beyond the valve plate when the valve plate is disposed in its open position, said lowermost portion of the housing also projecting beyond said hinge and said bracket for an appreciable distance.

References Cited in the file of this patent

UNITED STATES PATENTS

| | | |
|---|---|---|
| 173,452 | Donovan | Feb. 15, 1876 |
| 274,139 | Pietsch | Mar. 20, 1883 |
| 520,250 | Barnum | May 22, 1894 |
| 534,609 | Lunt | Feb. 19, 1895 |
| 929,514 | Tenold | July 27, 1909 |
| 1,576,712 | Bold | Mar. 16, 1926 |
| 1,635,842 | Hirshstein | July 12, 1927 |
| 2,028,756 | Crecca | Jan. 28, 1934 |
| 2,548,022 | Hirsch | Apr. 10, 1951 |

FOREIGN PATENTS

| | | |
|---|---|---|
| 595,013 | Great Britain | of 1947 |
| 695,589 | Great Britain | of 1953 |